(12) United States Patent
Epstein et al.

(10) Patent No.: US 10,942,888 B2
(45) Date of Patent: Mar. 9, 2021

(54) DATA TRANSFERRING WITHOUT A NETWORK INTERFACE CONFIGURATION

(71) Applicant: Raytheon Company, Waltham, MA (US)

(72) Inventors: Neil R. Epstein, El Segundo, CA (US); Pang Bee, Arcadia, CA (US); Gerard R. Richardson, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/364,920

(22) Filed: Mar. 26, 2019

(65) Prior Publication Data

US 2020/0311014 A1 Oct. 1, 2020

(51) Int. Cl.
G06F 15/173 (2006.01)
G06F 13/28 (2006.01)
H04L 29/08 (2006.01)

(52) U.S. Cl.
CPC ........ *G06F 15/17331* (2013.01); *G06F 13/28* (2013.01); *H04L 67/1097* (2013.01)

(58) Field of Classification Search
CPC . H04L 67/1097; G06F 15/17331; G06F 13/28
USPC ...................................................... 709/212
See application file for complete search history.

(56) References Cited

U.S. PATENT DOCUMENTS

| 7,464,174 | B1 | 12/2008 | Ngai |
| 8,498,206 | B2 | 7/2013 | Mraz |
| 8,560,646 | B1 | 10/2013 | Marshall et al. |
| 2009/0248896 | A1 | 10/2009 | Cohn |

(Continued)

FOREIGN PATENT DOCUMENTS

| EP | 1307028 | 5/2003 |
| WO | 03036465 | 5/2003 |
| WO | 2020198308 | 10/2020 |

OTHER PUBLICATIONS

"International Application Serial No. PCT/US2020/024626, International Search Report dated Jun. 17, 2020", 3 pgs.
"International Application Serial No. PCT/US2020/024626, Written Opinion dated Jun. 17, 2020", 7 pgs.
U.S. Appl. No. 16/654,940, filed Oct. 16, 2019, Alternate Control Channel For Network Protocol Stack.
U.S. Appl. No. 16/891,949, filed Jun. 3, 2020, Alternate Control Channel For Network Protocol Stack.

(Continued)

*Primary Examiner* — David R Lazaro
*Assistant Examiner* — Zia Khurshid
(74) *Attorney, Agent, or Firm* — Schwegman Lundberg & Woessner, P.A.

(57) ABSTRACT

Methods, systems, and computer-readable mediums for providing data between a sensor device and a target device. The data is provided using remote direct memory access. The target device includes a first network interface card for a first network. The target device includes a processor to encode a message to configure communication over the first network with a node. Configuration information regarding the communication over the first network is transmitted to the sensor device over a second, different network. The configuration information includes a media access control (MAC) address of a network interface card of the node and remote direct memory access (RDMA) settings. The processor decodes data associated with an RDMA operation from the sensor device received on the first network. The sensor device does not include a network interface card for the first network. The data includes the MAC address.

21 Claims, 4 Drawing Sheets

(56) References Cited

U.S. PATENT DOCUMENTS

| | | | |
|---|---|---|---|
| 2010/0048205 A1* | 2/2010 | Guilford | H04W 48/18 |
| | | | 455/432.1 |
| 2014/0052808 A1 | 2/2014 | Krishnan et al. | |
| 2015/0156289 A1 | 6/2015 | Pandit et al. | |
| 2016/0323164 A1* | 11/2016 | Cao | H04L 43/0811 |
| 2017/0155717 A1 | 6/2017 | Tamir et al. | |
| 2017/0171075 A1* | 6/2017 | Sajeepa | H04L 45/745 |
| 2019/0171612 A1* | 6/2019 | Shahar | G06F 15/167 |

OTHER PUBLICATIONS

"International Application No. PCT US2020 046485, International Search Report dated Oct. 13, 2020", 4 pgs.

"International Application Serial No. PCT US2020 046485, Written Opinion dated Oct. 13, 2020", 6 pgs.

* cited by examiner

DATA TRANSFERRING WITHOUT A NETWORK INTERFACE CONFIGURATION

TECHNICAL FIELD

Embodiments disclosed herein relate to network communications. Some embodiments relate to data transfer between nodes of a network.

BACKGROUND

Evaluation of exploitation risk in cyber-physical systems is encumbered by the large and complex input space. Traditional evaluation frameworks concentrate on evaluating software reliability in the context of user interfaces, file input/output (I/O), and network communications. These frameworks also are focused on evaluation of software applications, rather than firmware and/or custom application-specific integrated circuit (ASIC) interactions. In addition, existing frameworks do not have the capability to do integrated cyber-physical system evaluations such as radio frequency (RF), infrared (IR), global positioning system (GPS) signals with environmental factors of gravity, wind, thermal, mechanical stress, etc.

Transferring data between tethered devices over a network using traditional read/write operations is associated with high latency and limited throughput due to server/client operating system and kernel involvement, the implemented network infrastructure and its reliance on client and server network interface cards (NICs). Remote Direct Memory Access (RDMA) has become popular as a data transferring mechanism that bypasses the operating system and kernel during the reading and writing process, ultimately decreasing transmission latencies. Furthermore, due to its adoption of Ethernet protocols and standards, RDMA over Converged Ethernet (RoCE) has become a useful and cost-effective implementation, supporting RDMA reads and writes over Ethernet networks. Although latency can be improved using RoCE, the bandwidth associated with traditional Ethernet infrastructures (i.e., 1 GbE) caps the data transfer rate somewhere around 1 GbE for a single 1 GbE communication line, and the approach relies on both client-side and server-side NICs to communicate.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

The following detailed description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

DETAILED DESCRIPTION

Embodiments are directed to increasing transmission bandwidths and decreasing latency for RDMA over ethernet. Some embodiments use a 40 GbE RoCE network that permits data streaming between devices on the network near 40 GbE and eliminates client-side NIC reliance. In an example, one of the devices is a sensor that provides sensor data. For example, the sensor may be a location sensor that provides location information to a target device. The sensor data may be transferred over the 40 GbE RoCE network, even though the sensor does not include a NIC for the 40 GbE network. The sensor may not have a 40 GbE network NIC to allow the sensor to occupy a smaller physical space or be lighter in weight. Such considerations are important for system size, weight, and power (SWaP) considerations. In addition, sensors with NICs to slower networks may be less expensive compared with sensors with NICs to faster networks. Accordingly, various embodiments allow sensors with slower NICs to take advantage of fast networks.

Traditional approaches used to transfer data between devices on a network rely on network interface definitions and configurations for both the peripheral sender and target nodes to facilitate the handshaking process enabling communication. The enabling communication may include allocating the necessary resources and protections for the sending of data.

Figure 1:
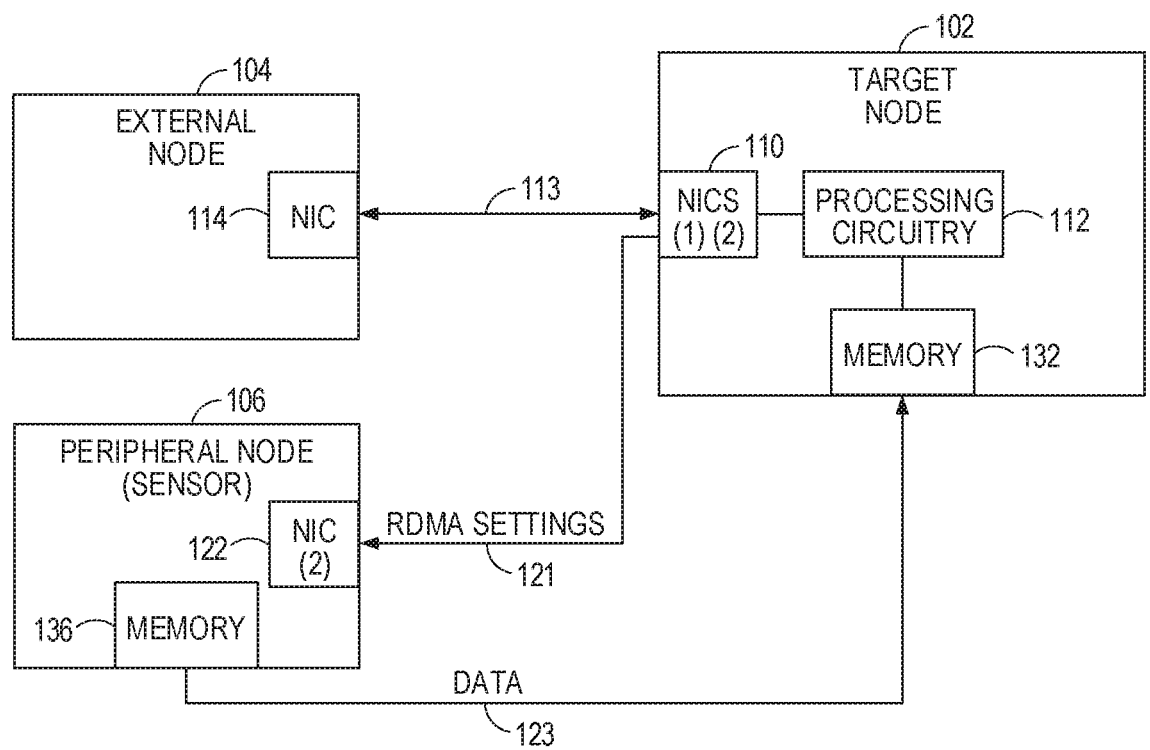
FIG. 1 illustrates a network in which peripheral data from a peripheral node is provided to a target node without a network interface configuration, in accordance with some embodiments.

A sensor may be configured to collect sensor data and transfer the sensor data to a target node (e.g., processor). For systems with multiple sensors, connected to one or more target nodes, it may be desirable to enable an architecture whereby each sensor may broadcast its data to any processing node in a cluster. Unfortunately, tethering multiple sensors to one or more processor(s) may be difficult in SWaP constrained systems if each sensor is required to have the hardware needed to define and configure the network interface for the offloading of sensor data to target cluster nodes. Peripheral nodes, in known systems, may lack defined network interfaces and therefore, cannot participate in the handshaking and resource allocation procedures underlying the data transfer process FIG. 1 illustrates a network in which peripheral data from a peripheral node is provided to a target node without a network interface configuration, in accordance with some embodiments. The peripheral node 106 may generate sensor data, such as temperature, location, speed, etc., and provides the sensor data to target node 102. The peripheral data may be transferred over a high-speed network. These embodiments are described in more detail below.

Some embodiments are directed to a communication device configured to operate as a target node 102 to receive peripheral data from a peripheral node 106. In these embodiments, the communication device may include memory 132 and network interface circuitry 110 configured to set up a network connection 113 with an external network interface card (NIC) 114 using a first network. The network interface circuitry 110 may also establish Remote Direct Memory Access (RDMA) settings for an RDMA connection with the external NIC 114 using the first network. In these embodiments, the RDMA connection may be configured to allow direct memory access of memory external to the target node 102, such as memory 136 of the peripheral node 106.

In some embodiments, the communication device may also include processing circuitry 112 to encode a message 121 for transmission to the peripheral node 106 using a second network. The message 121 may include the RDMA settings and a Media-Access Control (MAC) address of the external NIC 114. The message 121 may configure the peripheral node 106 for use of the RDMA connection. In these embodiments, the processing circuitry 112 may perform an RDMA operation with the peripheral node 106 using the RDMA settings to allow the target node 102 to receive data 123 directly from memory 136 of the peripheral node 106 over the first network. The data 123 may include peripheral data and the MAC address of the external NIC 114.

In some of these embodiments, the peripheral node 106 may be a network-interface constrained device (e.g., lacking the network interface for communicating over the first network). In some embodiments, the peripheral node 106 may be a sensor configured for collecting data and may be part of a sensor network comprising a plurality of sensors, although the scope of the embodiments is not limited in this respect.

In some embodiments, the network interface circuitry 110 may comprise a first NIC for communicating over the first network and a second NIC for communicating over the second network. The data 123 may be received from the peripheral node 106 in accordance with an RDMA over Converged Ethernet (RoCE) protocol, although this is not a requirement. The data 123 may be directly received by the memory 132 of the target node 102.

In some embodiments, the message 121 that is sent to the peripheral node 106 that included the RDMA settings may also include a port of the target node 102 for performance of the RDMA operation for receipt of the data 123. In some of these embodiments, a socket connection may be set up using a socket that is bound to a port of the target node 102. The socket connection may be used for the reception of the data 123, although the scope of the invention is not limited in this respect.

In some embodiments, the message 121 sent to the peripheral node 106 that included the RDMA settings may include a memory map of the memory 132 of the target node 102 indicating available memory locations for performance of the RDMA operation for receipt of the data 123. In some embodiments, the data 123 may also include one or more of the available memory locations in the memory 132 of the target node 102 for performance of the RDMA operation.

In some embodiments, the first network is a higher-speed wired network and the second network is a lower-speed wired network. The first network may be a 40 GbE network and the second network may be a 1 GbE network. In these embodiments, even though the peripheral node 106 only has a NIC 122 for the second network and does not have a NIC for the first network, the data 123 may be streamed to target node 102 at the higher data rate of the first network. Some alternate embodiments may incorporate a dual-frequency network approach for the separation of control information from transmission data. In some embodiments, the first network is a higher-speed wireless network and the second network is a lower-speed wireless network.

In some embodiments, the target node 102 itself may include the external NIC 114. In these embodiments, the external NIC 114 may be an internal NIC of the target node 102 and may be one of two or more NICs 110 of the target node 102. In other embodiments, the external NIC 114 may be part of another node, such as external node 104, which may be separate from the target node 102.

Figure 2:
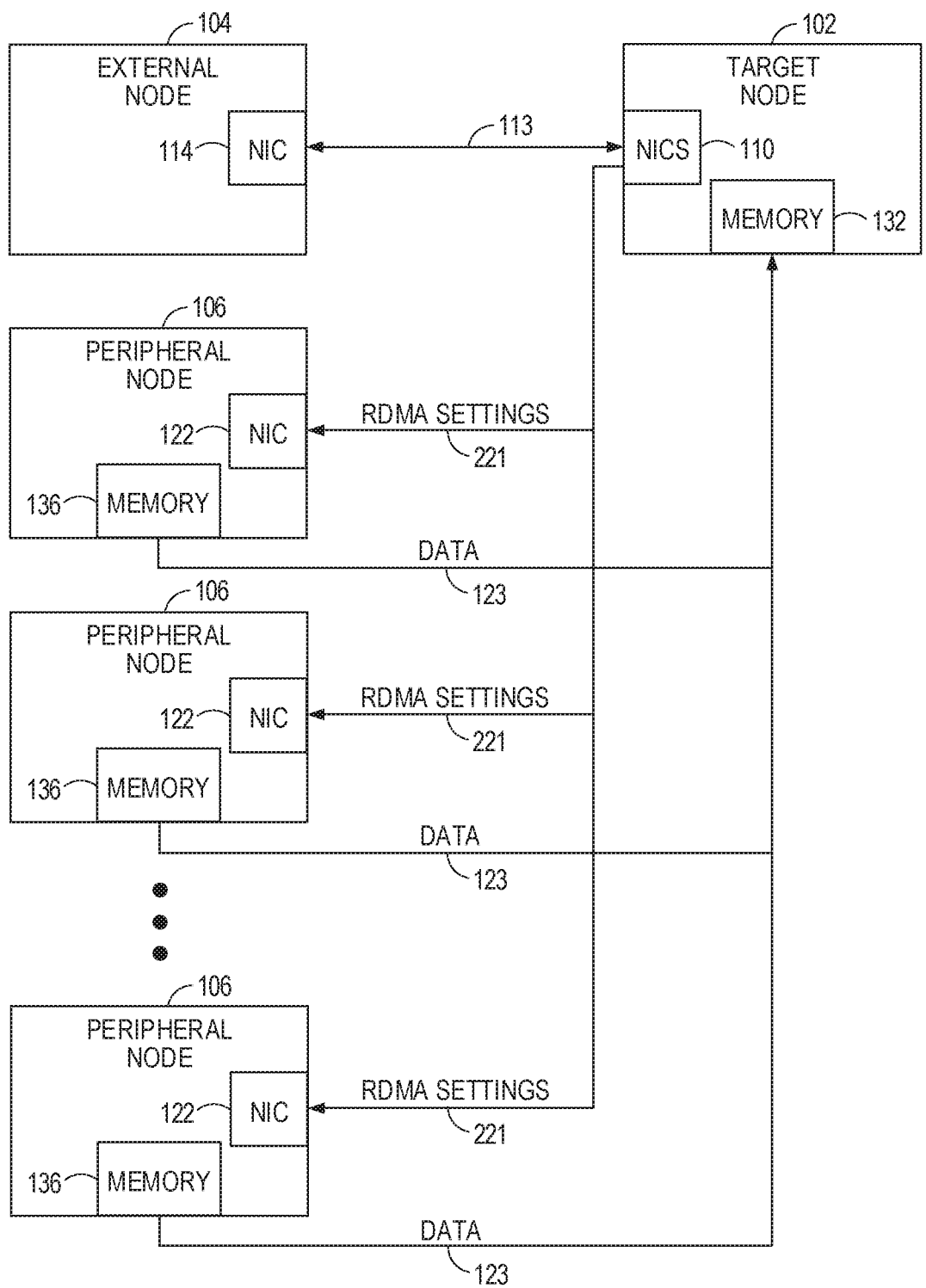
FIG. 2 illustrates a network in which peripheral data from a plurality of peripheral nodes is provided to a target node without a network interface configuration, in accordance with some embodiments.

FIG. 2 illustrates a network in which peripheral data from a plurality of peripheral nodes is provided to a target node without a network interface configuration, in accordance with some embodiments. In these embodiments, the target node 102 may be configured to receive streamed data from a plurality of peripheral nodes 106. In these embodiments, the target node 102 may configure each peripheral node 106 for use of an RDMA connection by encoding a message 221 comprising the RDMA settings and the MAC address of the external NIC 114 for transmission to each of the peripheral nodes 106 using the second network. In these embodiments, each of the encoded messages may indicate one or more memory locations of the memory 132 of the target node 102 for storage of data 123 from an associated one of the peripheral nodes 106. In these embodiments, data may be transferred directly from memory 136 of each peripheral node 106 to memory 132 of target node 102.

In these embodiments, the peripheral nodes 106 may be part of a sensor network of sensor nodes. In these embodiments, independent streaming of data from multiple peripheral nodes (e.g., sensors) that lack a sufficient network interface for such data transfer may be achieved. For example, data may be streamed at rates associated with a 40 GbE network even though the peripheral nodes do not have a 40 GbE NIC.

In some embodiments, once configured, the peripheral nodes 106 may update the memory 132 of the target node 102. In an example, the peripheral nodes 106 may all use the MAC address of the external node 104. In other examples, the peripheral nodes 106 use different MAC addresses. For example, the MAC addresses may be from different NICs of the external node 104 or from NICs from other nodes, not shown.

Figure 3:
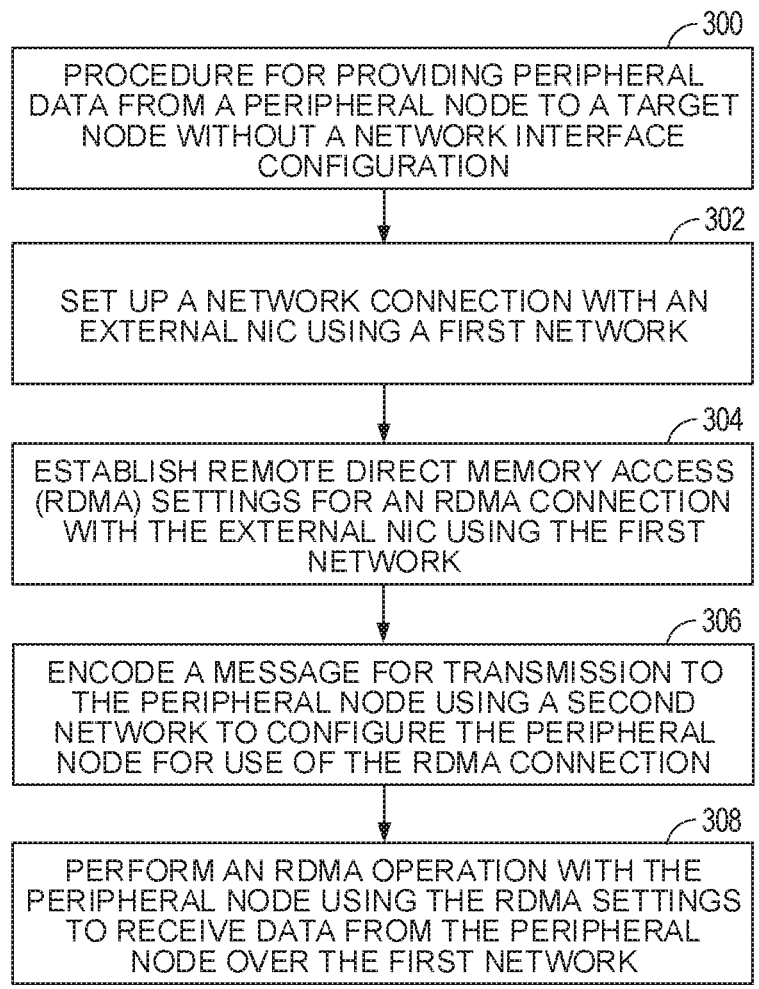
FIG. 3 illustrates a procedure for providing peripheral data from a peripheral node to a target node without a network interface configuration, in accordance with some embodiments.

FIG. 3 illustrates a procedure for providing peripheral data from a peripheral node to a target node without a network interface configuration, in accordance with some embodiments. Procedure 300 may be performed by a target node, such as target node 102 (FIG. 1). Referring also to FIG. 1, operation 302 comprises setting up a network connection 113 between network interface circuitry 110 of the target node 102 and an external NIC 114 using a first network. Operation 304 comprises establishing RDMA settings for an RDMA connection with the external NIC 114 using the first network. The RDMA connection is configured to allow direct memory access of memory external to the target node 102 (e.g., memory 136 (FIG. 1 and FIG. 2)). Operation 306 comprises encoding a message 121 for transmission to the peripheral node 106 using a second network, the message 121 comprising the RDMA settings and a Media-Access Control (MAC) address of the external NIC 114. The message may configure the peripheral node 106 for use of the RDMA connection. Operation 308 comprises performing an RDMA operation with the peripheral node 106 using the RDMA settings to receive data 123 from the peripheral node 106 over the first network. The data 123 may include peripheral data and the MAC address of the external NIC 114.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured to perform certain operations (e.g., as a special-purpose processor, such as a field programmable gate array (FPGA) or an application-specific integrated circuit (ASIC)). A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry (e.g., a FPGA or an ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 4:
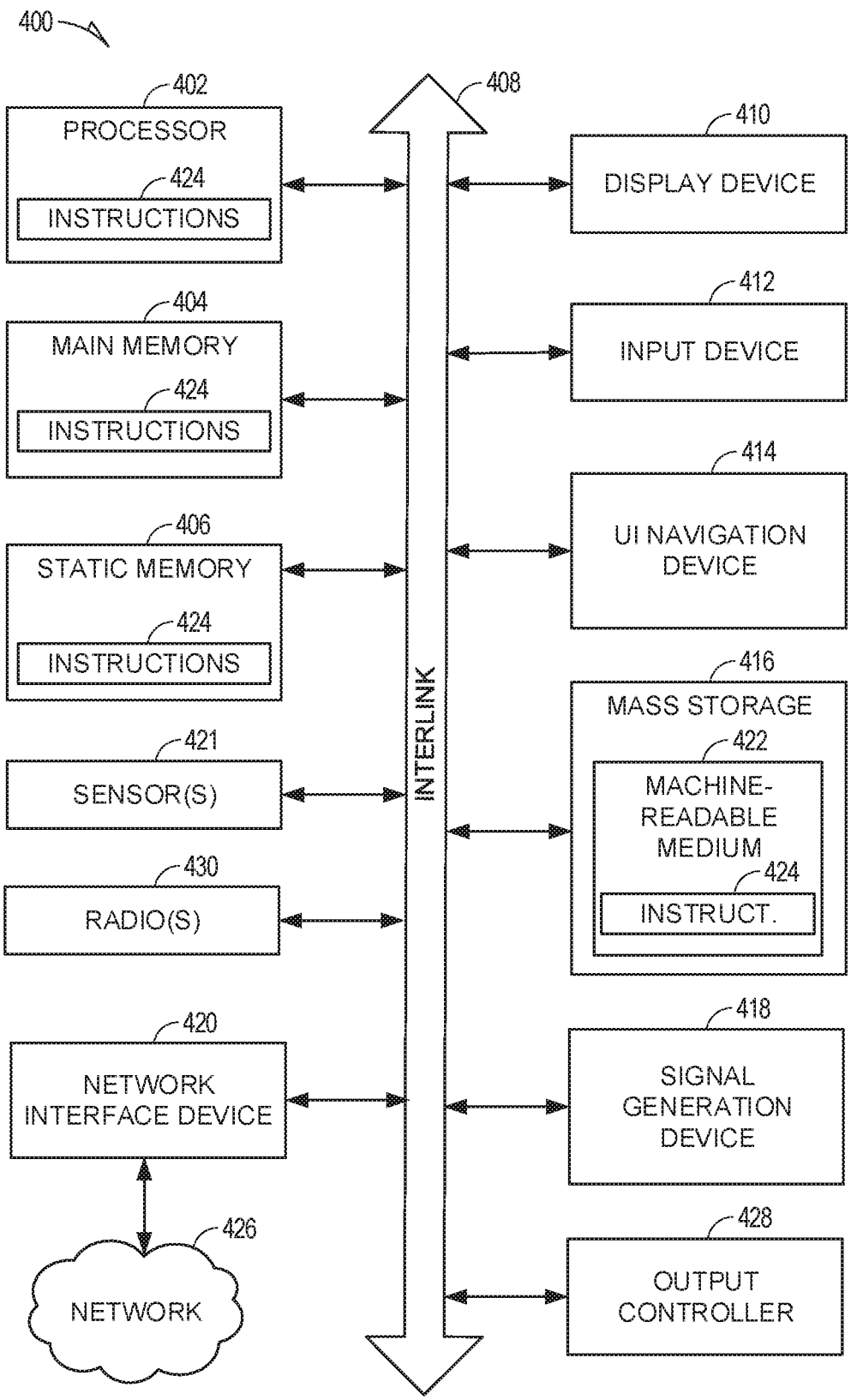
FIG. 4 illustrates, by way of example, a block diagram of an embodiment of a processing system on which one or more of the processes discussed herein, can be implemented.

FIG. 4 illustrates, by way of example, a block diagram of an embodiment of a processing system 400 on which one or more of the processes discussed herein, can be implemented. In these embodiments, target node 102 may be implemented by the system 400. In these embodiments, a non-transitory computer-readable storage medium 422 may be configured to store instructions 424 for execution by processing circuitry 402 of a target node 102 (FIG. 1) to configure the target node 102 to perform operations to receive peripheral data 123 (FIG. 1) from a peripheral node 106 (FIG. 1). In these embodiments, the instructions 424 configure the processing circuitry 402 to configure network interface circuitry 110 (FIG. 1) to set up a network connection 113 (FIG. 1) with an external NIC 114 (FIG. 1) using a first network. The network interface circuitry 110 (FIG. 1) may establish Remote Direct Memory Access (RDMA) settings for an RDMA connection with the external NIC 114 (FIG. 1) using the first network. The instructions may also configure the processing circuitry 402 to encode a message 121 (FIG. 1) for transmission to the peripheral node 106 (FIG. 1) using a second network. The instructions 424 may also configure the processing circuitry 402 to perform an RDMA operation with the peripheral node 106 (FIG. 1) using the RDMA settings to receive data 123 (FIG. 1) from the peripheral node 106 (FIG. 1) over the first network. In these embodiments, the network interface device 420 of system 400 may operate as one or more NICs, such as NIC 110 (FIG. 1).

In some embodiments, the system 400 may also include one or more sensors 421, such as a global positioning system (GPS) sensor, a compass, and/or an accelerometer. In some embodiments, the system 400 may include an output controller 428, such as a serial (e.g., universal serial bus (USB)), a parallel, or other wired or wireless (e.g., infrared (IR), near field communication (NFC), etc.) controller.

In alternative embodiments, the system 400 operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example processing system 400 includes a processor or processing circuitry 402 (e.g., a central processing unit (CPU), a graphics processing unit (GPU) or both), a main memory 404 and a static memory 406, which communicate with each other and other system components via a bus 408. The processing system 400 may further include a video display unit 410 (e.g., a liquid crystal display (LCD) or a cathode ray tube (CRT)). The processing system 400 also includes an alphanumeric input device 412 (e.g., a keyboard), a user interface (UI) navigation device 414 (e.g., a mouse), a mass storage unit 416, a signal generation device 418 (e.g., a speaker), a network interface device 420, and radios 430 such as Bluetooth, WWAN, WLAN, and NFC, permitting the application of security controls on such protocols.

The mass storage unit 416 includes the machine-readable medium 422 on which is stored the one or more sets of instructions and data structures (e.g., software) 424 described above and embodying or utilized by any one or more of the methodologies or functions described herein. The instructions 424 may also reside, completely or at least partially, within the main memory 404, the static memory 406, and/or within the processor 402 during execution thereof by the processing system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 424 may further be transmitted or received over a communications network 426 using a transmission medium. The instructions 424 may be transmitted using the network interface device 420 and any one of a number of well-known transfer protocols (e.g., HTTP). Examples of communication networks include RDMA and RoCE networks as discussed above, as well as a local area network ("LAN"), a wide area network ("WAN"), the Internet, mobile telephone networks, Plain Old Telephone (POTS) networks, and wireless data networks (e.g., WiFi, WLAN, LTE and 5G networks). The term "transmission medium" shall be taken to include any tangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A communication device configured to operate as a target node to receive peripheral data from a peripheral node, the communication device comprising:
    memory;
    network interface circuitry configured to set up a network connection with an external network interface card (NIC) using a first NIC of the communication device, the network interface circuitry further configured to establish Remote Direct Memory Access (RDMA) settings for an RDMA connection using a media access control (MAC) address of the external NIC; and
    processing circuitry to encode a message for transmission from the communication device to the peripheral node using a second NIC of the communication device, the message comprising the RDMA settings and the MAC address of the external NIC, the message configuring the peripheral node to use the RDMA connection, including using the MAC address of the external NIC as an address of the peripheral node in an RDMA operation,
    wherein the processing circuitry is configured to perform an RDMA operation with the peripheral node using the RDMA settings to receive peripheral data from the peripheral node via the MAC address of the external NIC as the address of the peripheral node for storage in the memory.

2. The communication device of claim 1, wherein the network interface circuitry comprises the first NIC for communicating over a first network and the second NIC for communicating over a second network.

3. The communication device of claim 2, wherein the data is received by the memory of the communication device from the peripheral node in accordance with an RDMA over Converged Ethernet (RoCE) protocol.

4. The communication device of claim 2, wherein the message further includes a port of the target node for receipt of the data via the RDMA operation.

5. The communication device of claim 2, wherein the message further includes a memory map of the memory of the target node indicating available memory locations of the communication device for receipt of the data via the RDMA operation.

6. The communication device of claim 2 wherein the first network is a higher-speed wired network and the second network is a lower-speed wired network.

7. The communication device of claim 6 wherein the first network is a 40 GbE network and the second network is a 1 GbE network.

8. The communication device of claim 2 wherein the first network is a higher-speed wireless network and the second network is a lower-speed wireless network.

9. The communication device of claim 1, wherein the target node comprises the external NIC.

10. The communication device of claim 1, the target node configures each peripheral node of a plurality of peripheral nodes for use of an RDMA connection by encoding a message comprising the RDMA settings, the RDMA settings configuring a peripheral node receiving the message to use the MAC address of the external NIC as an address of the peripheral node during an RDMA operation, for transmission to each of the peripheral nodes using the second NIC, wherein each of the encoded messages indicates one or more memory locations of the memory of the target node for storage of data from an associated one of the peripheral nodes.

11. The communication device of claim 1,
    wherein the processing circuitry is further configured to:
        encode a plurality of messages for transmission, via the second NIC, to a corresponding plurality of peripheral nodes, each of the plurality of messages comprising RDMA settings for a respective peripheral node, each of the respective RDMA settings indicating a different MAC address for use by the respective peripheral node as an address of the respective peripheral node in an RDMA operation, each of the different MAC addresses from other different communication devices, and
        perform a plurality of RDMA operations, each of the plurality of RDMA operations including receiving data from one of the plurality of peripheral nodes into the memory, each respective peripheral node using a different respective MAC address indicated in the respective RDMA settings as an address of the respective peripheral node in the respective RDMA operation.

12. The communication device of claim 1,
    wherein the processing circuitry is further configured to:
        encode a plurality of messages for transmission, via the second NIC, to a corresponding plurality of peripheral nodes, each of the plurality of messages comprising RDMA settings for a respective peripheral node, each of the respective RDMA settings indicating the MAC address of the external NIC for use by the respective peripheral node as an address of the respective peripheral node in an RDMA operation, and
        perform a plurality of RDMA operations, each of the plurality of RDMA operations including receiving data from one of the plurality of peripheral nodes into the memory, each respective peripheral node using the respective MAC address indicated in the respective RDMA settings as an address of the respective peripheral node in the respective RDMA operation.

13. A non-transitory computer-readable storage medium that stores instructions for execution by processing circuitry of a target node to configure the target node to perform operations to receive peripheral data from a peripheral node, wherein the instructions configure the processing circuitry to:
    configure network interface circuitry of the target node to set up a network connection with an external network interface card (NIC) using a first NIC, the network interface circuitry further configured to establish Remote Direct Memory Access (RDMA) settings for an RDMA connection using a media access control (MAC) address of the external NIC;
    encode a message for transmission from the target node to the peripheral node using a second NIC, the message comprising the RDMA settings and the MAC address of the external NIC, the message to configure the peripheral node for use of the RDMA connection using the MAC address of the external NIC as an address of the peripheral node in a RDMA operation; and
    perform an RDMA operation with the peripheral node using the RDMA settings to receive data from the peripheral node via the MAC address of the external NIC as the address of the peripheral node for storage in a memory of the target node.

14. The computer-readable storage medium of claim 13, wherein the network interface circuitry comprises the first NIC for communicating over a first network and the second NIC for communicating over a second network.

15. The computer-readable storage medium of claim 14, wherein the data is received from the peripheral node in accordance with an RDMA over Converged Ethernet (RoCE) protocol.

16. The computer-readable storage medium of claim 14, wherein the message further includes a port of the target node for receipt of the data via the RDMA operation.

17. The computer-readable storage medium of claim 14, wherein the message further includes a memory map of the memory of the target node indicating available memory locations for receipt of the data via the RDMA operation.

18. A method for operating a target node for receipt of peripheral data from a peripheral node without a network interface connection, the method comprising:
    setting up a network connection with an external network interface card (NIC) using a first NIC;
    establishing Remote Direct Memory Access (RDMA) settings for an RDMA connection with using a media access control (MAC) address of the external NIC, the RDMA connection configured to allow direct memory access of memory external to the target node;
    encoding a message for transmission from the target node to the peripheral node using a second NIC, the message comprising the RDMA settings and the MAC address of the external NIC, the message to configure the peripheral node for use of the RDMA connection using the MAC address of the external NIC as an address of the peripheral node in a RDMA operation; and
    performing an RDMA operation with the peripheral node using the RDMA settings to receive data from the peripheral node via the MAC address of the external NIC as the address of the peripheral node for storage in a memory of the target node.

19. The method of claim 18, wherein the target node comprises the first NIC for communicating over a first network and the second NIC for communicating over a second network.

20. The method of claim 19, wherein the data is received by the memory of the target node from the peripheral node in accordance with an RDMA over Converged Ethernet (RoCE) protocol.

21. The method of claim 19, wherein the message further includes a memory map of the memory of the target node indicating available memory locations for performance of the RDMA operation for receipt of the data.

* * * * *